United States Patent
Spicher

(10) Patent No.: US 6,227,787 B1
(45) Date of Patent: May 8, 2001

(54) DEVICE FOR LOADING WORKPIECE PALLETS

(75) Inventor: Hermann Spicher, Bergisch Galdbach (DE)

(73) Assignee: Hermann Spicher GmbH, Köln (DE)

(*) Notice: Subject to any disclaimer, the term of this patent is extended or adjusted under 35 U.S.C. 154(b) by 0 days.

(21) Appl. No.: 09/269,404

(22) PCT Filed: Sep. 19, 1997

(86) PCT No.: PCT/DE97/02141

§ 371 Date: May 26, 1999

§ 102(e) Date: May 26, 1999

(87) PCT Pub. No.: WO98/13172

PCT Pub. Date: Apr. 2, 1998

(30) Foreign Application Priority Data

Sep. 26, 1996 (DE) .......................................... 296 16 751 U

(51) Int. Cl.[7] .................................................... B65G 1/06
(52) U.S. Cl. ........................ 414/416; 414/416; 414/799; 414/810; 53/235
(58) Field of Search ..................... 53/235, 258; 414/403, 414/799, 810, 416, 417

(56) References Cited

U.S. PATENT DOCUMENTS

| | | | |
|---|---|---|---|
| 2,966,995 | * 1/1961 | Steinle | 414/799 |
| 3,934,920 | * 1/1976 | Rowekamp | 414/416 |
| 3,946,884 | * 3/1976 | Kato et al. | 414/799 |
| 4,381,164 | * 4/1983 | Koster et al. | 414/83 |
| 4,411,574 | * 10/1983 | Riley | 414/416 |
| 4,685,271 | * 8/1987 | Ringer et al. | 53/246 |

FOREIGN PATENT DOCUMENTS

| | | |
|---|---|---|
| 514397 | * 12/1971 | (CH) . |
| 0416446 | 3/1991 | (EP) . |

* cited by examiner

Primary Examiner—Joseph A. Fischetti
(74) Attorney, Agent, or Firm—Browdy and Neimark

(57) ABSTRACT

The invention is directed to a device (1) for automatically loading workpiece palette (2) with delicate workpieces (3), the workpiece palette (2) having straight cords (6) disposed in a grid- and/or comb-like manner with free spaces (7) between the rods (6). In order to hold the workpiece palette (2) a palette gripper (12) is provided, which lowers an empty workpiece palette (2) from a lowering position (13) lying above the empty positioning surface (9) through the plane of the latter into a receiving position (14) lying below the positioning surface (9), the receiving region (15) of the workpiece palette (2) being lower than the plane of the positioning surface (9). When the workpiece palette (2) has been lowered, the workpieces (3) are laid on the positioning surface (9). The palette gripper (12) raises the workpiece palette (2) out of the receiving position (14) such that the workpieces (3) are also raised.

20 Claims, 8 Drawing Sheets

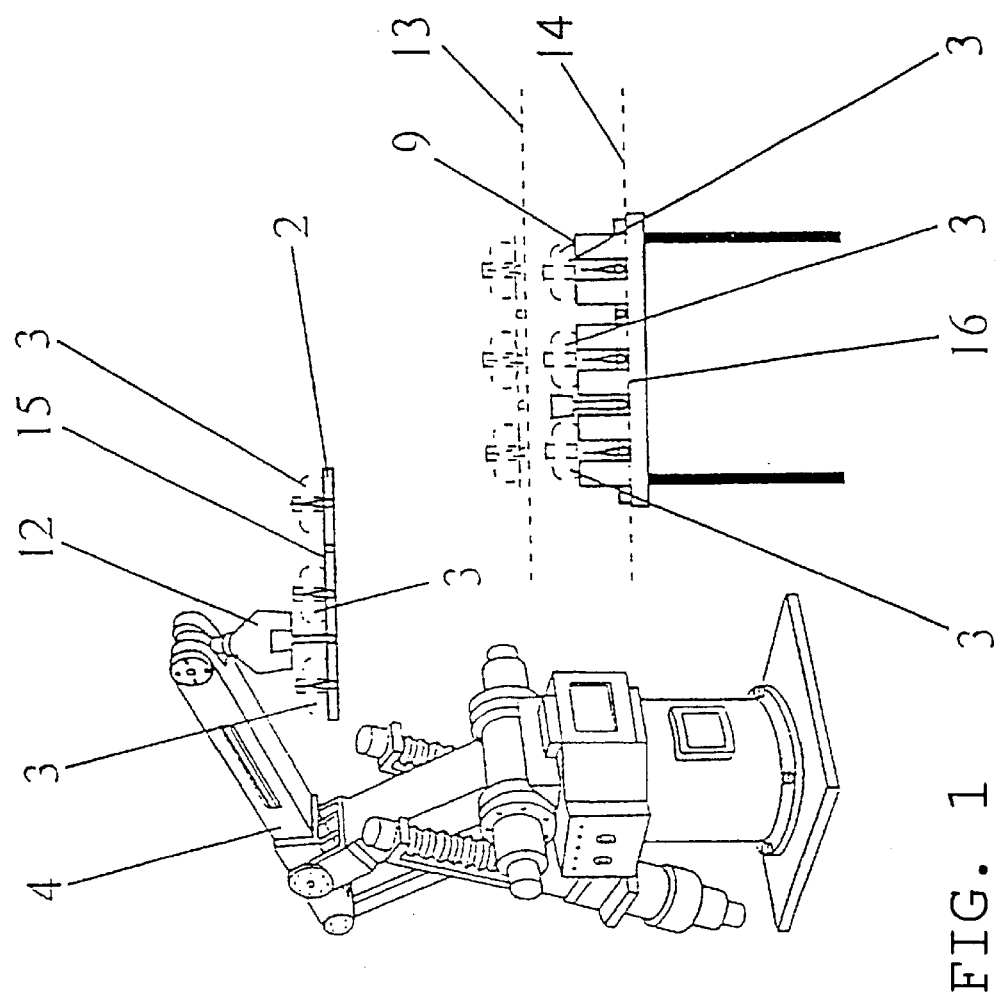
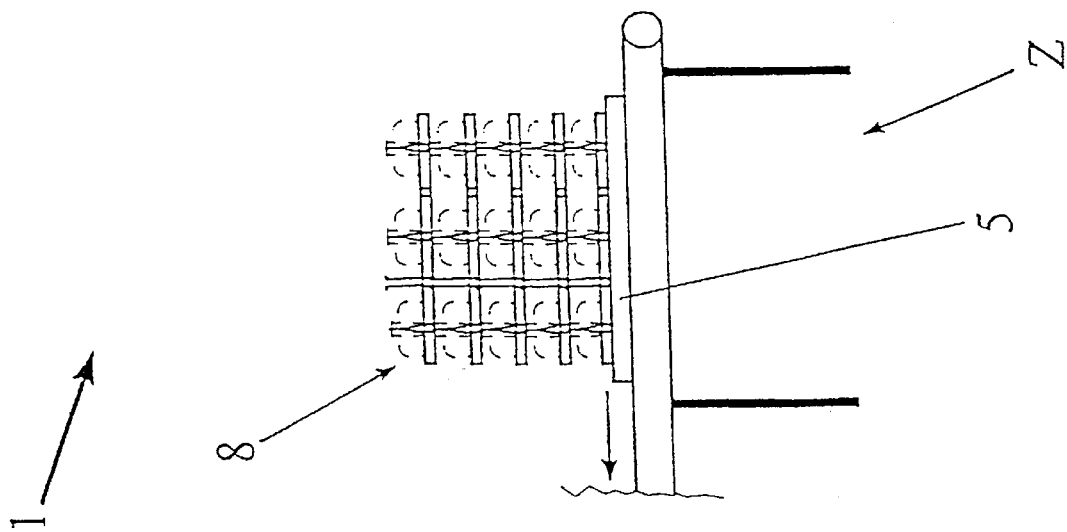
FIG. 1

DEVICE FOR LOADING WORKPIECE PALLETS

BACKGROUND OF THE INVENTION

The invention concerns a device for the automatic handling of delicate workpieces, consisting of at least one workpiece pallet for accepting the workpieces in a receiving region, the workpiece pallet comprising preferably straight rods disposed in grid and/or comb-like manner with free spaces between the rods, at least one workpiece gripper for depositing the workpieces on a surface provided for this purpose, and a pallet gripper for holding the workpiece pallet.

PRIOR ART

Workpiece pallets of this kind are used, for example, to hold metal parts which are placed in a heat treating furnace for heat treatment, an electroplating bath for galvanic surface treatment, or on special conveyor systems for transport through a continuous furnace. The workpiece pallets are usually made of special steel with suitable high-temperature strength. Particularly when using workpiece pallets of this kind in heat treating furnaces, carburisation of the steel an result in substantial elongation of the workpiece pallet. In addition, thermal stresses are generated which cause considerable deformation of the workpiece pallet.

The workpiece pallets are loaded with workpieces either manually or automatically using a suitable material handling machine. If the delicate workpieces are loaded onto the workpiece pallets by a piece-worker, they are often not handled gently and with the necessary care. In this context, even minor damage, which can occur by dropping the workpiece on the workpiece pallet, for example, already results in rejects.

The direct, automatic loading of the workpiece pallets, where the workpieces are deposited at a specified point and at a defined height, is also difficult. Releasing a workpiece in a specified position leads to a situation where the workpiece either drops onto one type of workpiece pallet, or is pressed down onto another. In both cases, delicate workpieces are very easily damaged by a hard landing on the workpiece pallet, or by being pressed down on it.

OBJECT AND SUMMARY OF THE INVENTION

The invention is based on the object of designing a simple and inexpensive device with which workpiece pallets can be loaded automatically, rapidly and precisely, and delicate workpieces handled gently.

According to the invention, the object is solved in that at least one positioning device with recesses is provided, into which the rods of the workpiece pallet can be lowered, that the positioning device has a positioning surface for depositing the workpieces by means of the workpiece gripper, and that the pallet gripper is designed such that it can lower the empty workpiece pallet from a lowering position lying above the empty positioning surface, through the plane of the positioning surface and into a receiving position lying below the positioning surface, such that the receiving region of the workpiece pallet is lower than the positioning surface and, after depositing the workpieces on the workpiece pallet lowered below the positioning surface, the workpiece pallet can be raised out of the receiving position such that the work pieces are raised from the positioning surface by the workpiece pallet.

The positioning surface of the positioning device advantageously serves as a support plane onto which delicate workpieces can be dropped or pressed without being damaged. The pallet gripper preferably operates automatically and is program-controlled. It can be raised from the receiving position as slowly as desired. In this way, the workpieces can be raised from the positioning surface of the positioning device very gently by the receiving region of the work piece pallet. The pallet gripper then places the workpiece pallets with the workpieces on a conveyor system of a continuous furnace, for example, or some other feed system for a subsequent production step. The workpiece pallets used can expediently be stacked in both empty and loaded condition.

For the sake of simplicity, the positioning surface of the positioning device is provided on a positioning block. This positioning block has pocket-like recesses which are simple to manufacture, into which the rods of the workpiece pallet can be lowered. Of course, the positioning device can be of any suitable design which results in a positioning surface which acts as a support plane.

In order to systematically rule out any damage to the delicate workpieces, the positioning block is made of soft material, preferably plastic.

The workpiece pallets can be grid-like pallets, the lattice members of which are connected to transverse rods at both ends. On the other hand, pallets with comb-like rods can also be used, the rods of which are firmly connected to the workpiece pallet at one end, the other end being free. Workpiece pallets which are of a combined grid and comb-like design can also be used. The shape of the recesses depends on the type of workpiece pallet used.

The pocket-like recesses of the positioning block can be designed as simple-to-manufacture, continuous grooves. The grooves can intersect, for example, so that grid-like pallets can be lowered into the positioning block. The remaining areas of the positioning block, which make up the positioning surface, pass through the free spaces between the lattice members.

For the sake of simplicity, the side walls of the recesses are positioned essentially parallel to the lowering and raising direction of the workpiece pallet.

The rods of the workpiece pallet can advantageously be lowered into the positioning block at a lateral distance from the walls of the recesses on all sides. This measure makes it possible for even severely deformed workpiece pallets to still be easily lowered into the recesses of the positioning block and lifted out again, without becoming caught in the positioning block.

Workpiece pallets which have at least one peg or the like with an undercut, can be picked up by a pallet gripper with at least one claw. In this case, the pallet gripper advantageously picks up the workpiece pallet by the existing undercut.

The workpiece pallet picked up by the pallet gripper is usually suspended from the pallet gripper and can swing slightly back and forth. In order to prevent such swinging back and forth and to achieve good hold in the specified position, the pallet gripper can be provided with at least one additional support pin, with which the pallet can be held in a design specified transport position relative to the pallet gripper.

In order to hold the workpiece pallet in the specified transport position, the support pin is expediently spring-loaded and presses on the workpiece pallet. As a result, the claw pulls up on the workpiece pallet while the support pin presses down on the workpiece pallet, such that it is held firmly in the specified position.

If workpiece pallets are used whose receiving regions are provided with workpiece mounts in the form of arbors in order to accept workpieces with holes, the problem arises that the positions of the arbors also change due to the change in length and deformation of the workpiece pallet. Nevertheless, the workpieces can still be deposited precisely in the specified position on the positioning block. In this case, the arbors are not positioned in the centre of the holes in the workpieces when raising the workpieces, but rather eccentrically. This eccentric position may merely not be located completely outside the diameter of the hole, so that the workpieces can be centred on the arbors. The workpieces are not dropped onto the arbors or pressed onto them, but rather lifted gently from the positioning surface by slowly raising the workpiece pallet. There is no damage to the workpieces.

Of course, workpiece pallets with so-called nests can also be used instead of those with arbors. In this context, a nest is positioned on the receiving region of a workpiece pallet and has a protruding rim which at least partially surrounds a workpiece, such that the workpiece is held firmly inside the rim with a little clearance to the rim. Workpieces of any kind can be deposited in the nests. In particular, workpieces without holes can be handled in this way.

The support pin preferably rests on the free end of an arbor.

The pallet gripper and the workpiece gripper can be arranged on a portal-type loading system.

In another configuration, a robot on which the pallet gripper and the workpiece gripper are arranged, is put to advantageous use. Simple handling systems can also be provided instead of a robot.

An articulated-arm robot, on whose articulated arm a multi-gripper head is mounted, is expediently provided as a robot. The multi-gripper head is equipped with at least two workpiece grippers and one pallet gripper. In addition, the multi-gripper head can also be provided with at least one additional base pallet gripper for handling base pallets, on which stacks of loaded workpiece pallets can be transported.

BRIEF DESCRIPTION OF THE DRAWINGS

An example of the device is illustrated below based on a drawing. The drawings show the following:

FIG. 1 A device for automatically loading delicate workpieces onto workpiece pallets, FIG. 2 A side and top view of a configuration of a workpiece pallet, FIG. 3 A top and cross-sectional side view of a configuration of a positioning block, FIG. 4 The positioning block as per FIG. 3 and the workpiece pallet as per FIG. 2 (dashed lines), where the workpiece pallet is lowered into the positioning block, FIG. 5 A side view of a positioning block with a lowered workpiece pallet (dashed lines) and workpieces (dash-dotted lines) in receiving position, FIG. 6 A side view of a positioning block with a raised workpiece pallet (dashed lines) and work ieces (dash-dotted lines) centred by arbors of the workpiece pallet, FIG. 7 A cross-section of a pallet gripper, FIG. 8 A bottom view of a multi-gripper head.

DETAILED DESCRIPTION OF THE PREFERRED EMBODIMENT(S) OF THE INVENTION

Figure 2:
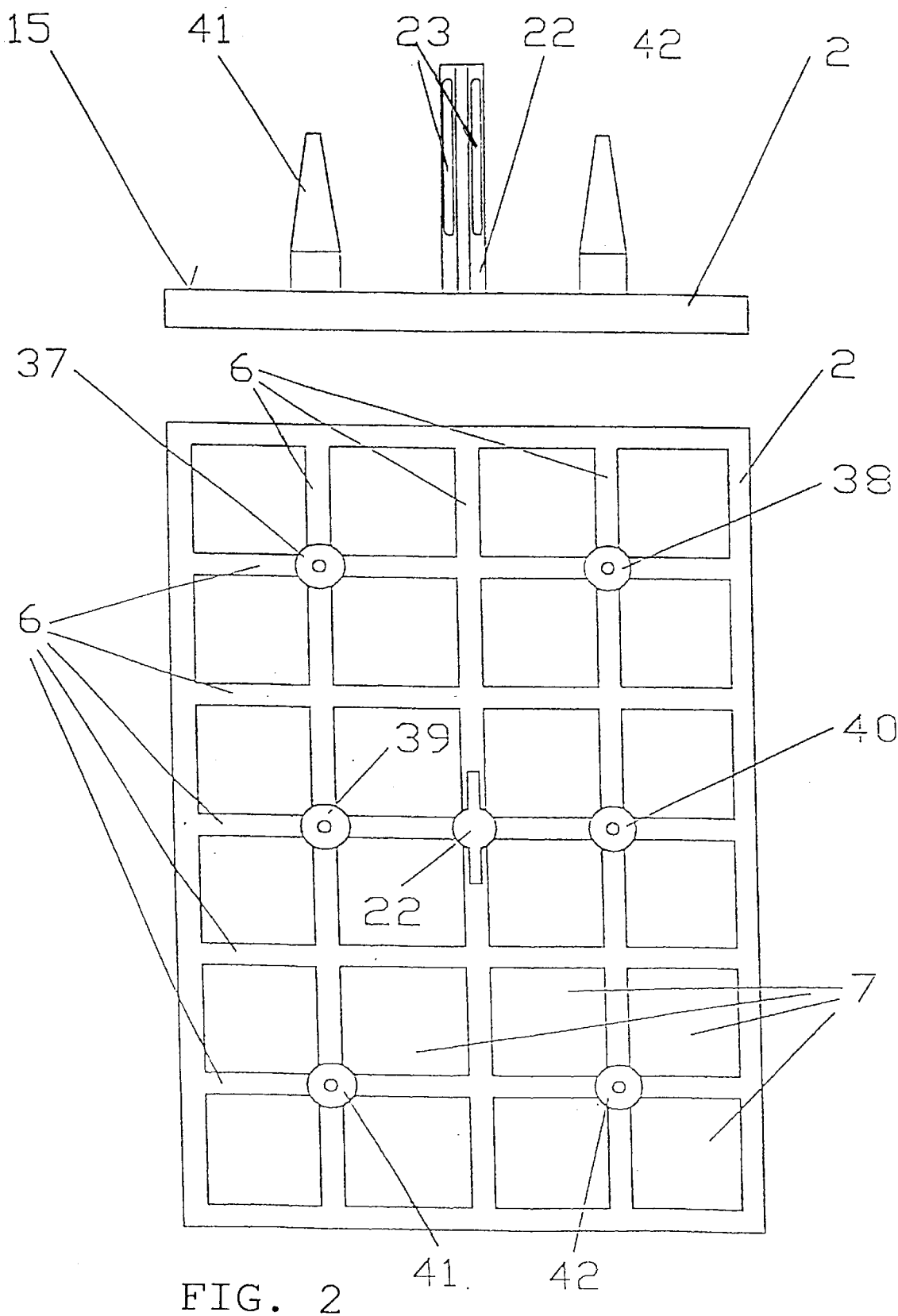
Figure 3:
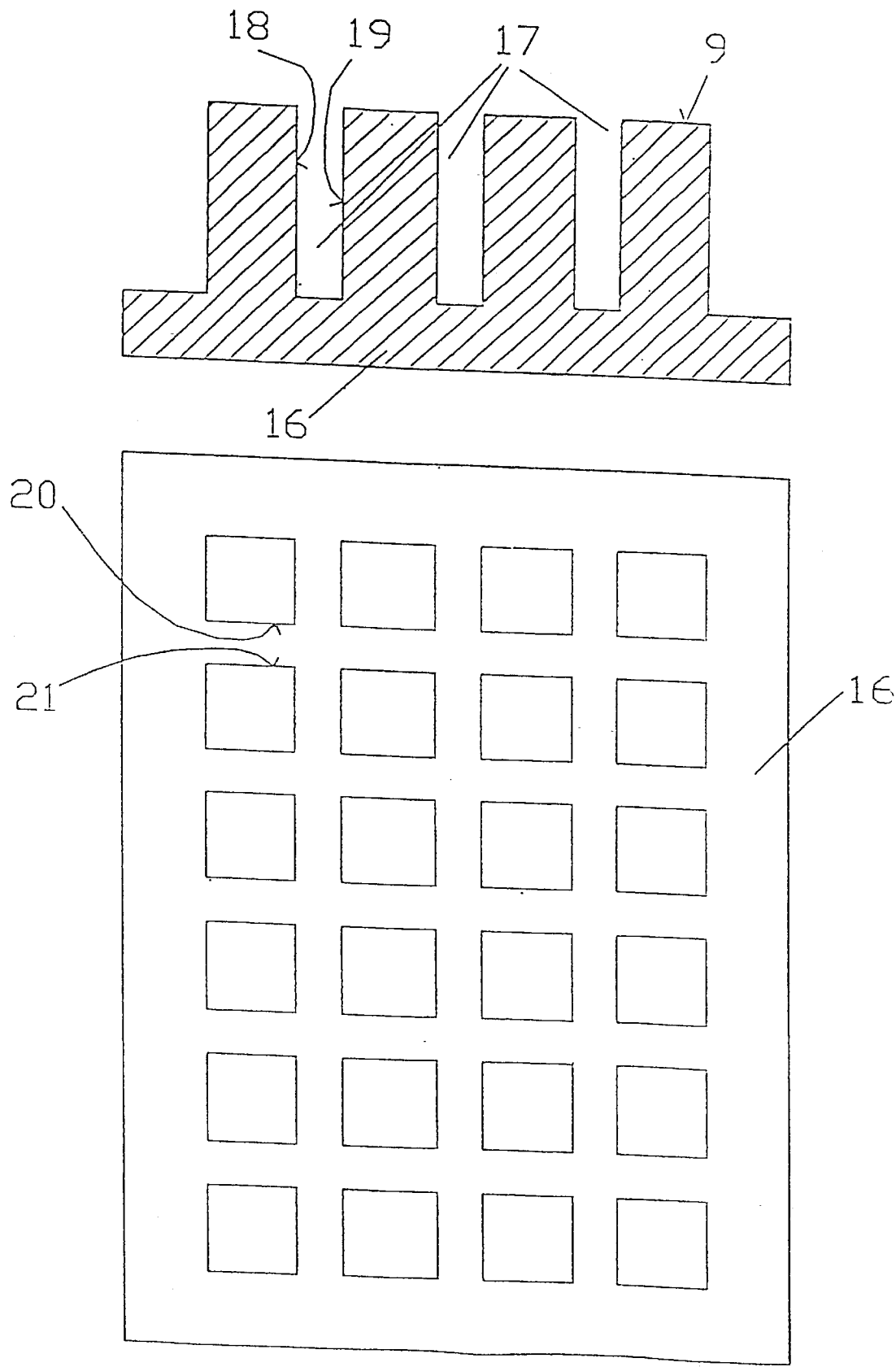
Figure 4:
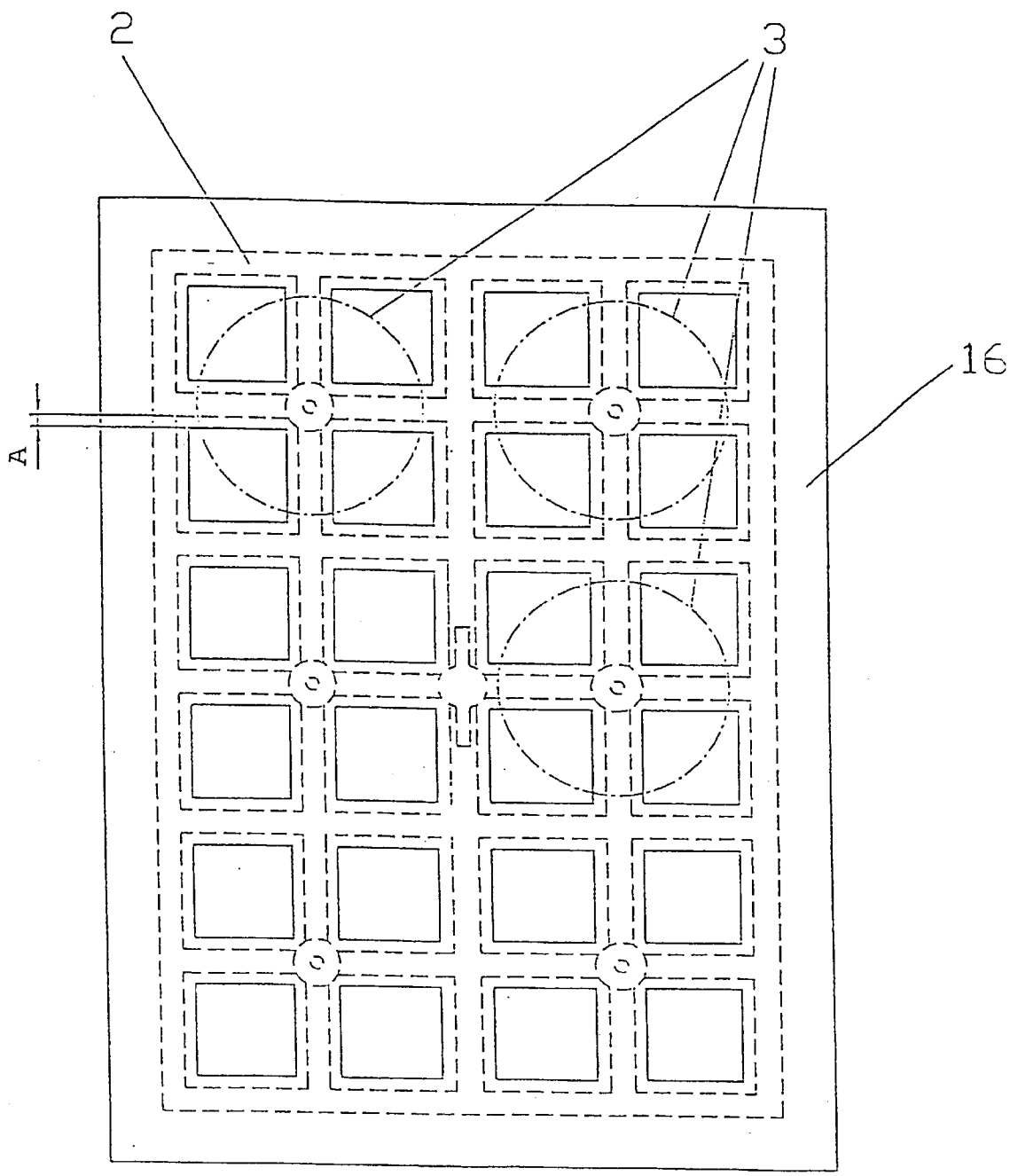

According to the drawing, device 1 for automatically loading workpiece pallet 2 with delicate workpieces 3 consists of an articulated-arm robot 4 for handling workpieces 3, workpiece pallet 2 and base pallet 5. Workpiece pallet 2 consist of grid-like, preferably straight rods 6 with free s paces 7 between rods 6. Base pallet 5 serves to transport empty or loaded workpiece pallet stacks 8, for example, to deposit workpiece pallet stacks 8 on a feed system Z, which conveys workpieces 3 to an installation which performs the next production step. Device 1 further consists of a support plane in the form of a positioning surface 9, on which workpieces 3 can be deposited with the help of two workpiece grippers 10 and 11. Empty workpiece pallet 2 can be lowered by a pallet gripper 12 from a lowering position 13 lying above positioning surface 9, through the plane of positioning surface 9 into a receiving position 14 lying below positioning surface 9. In this context, receiving region 15 of workpiece pallet 2 is lower than the plane of positioning surface 9. Workpieces 3 can be laid on positioning surface 9 after workpiece pallet 2 has been lowered. Subsequently, workpiece pallet 2 can be raised by pallet gripper 12 out of receiving position 14, where workpieces 3 can be raised from positioning surface 9 by workpiece pallet 2.

Positioning surface 9 is provided on a positioning block 16. Positioning block 16 has pocket-like recesses 17. Pocket-like recesses 17 of positioning block 16 are designed as continuous grooves into which rods 6 of workpiece pallet 2 can be lowered. In the present configuration, positioning block 16 is made of plastic. Side walls 18, 19 and 20, 21 of recesses 17 are essentially parallel to the lowering and raising direction of workpiece pallet 2.

Rods 6 of workpiece pallet 2 can be lowered into positioning block 16 at a lateral distance A on all sides from walls 18, 19 and 20, 21 of recesses 17.

The workpiece pallets used in the present configuration are grid-like pallets. Both ends of rods 6 of the grid connect to transverse rods 6 of the grid, as illustrated in FIG. 2.

Pocket-like recesses 17 of positioning block 16 are designed as simple-to-manufacture, continuous grooves. The grooves intersect, so that grid-like workpiece pallets 2 can be lowered into positioning block 16. The remaining areas of positioning block 16 which make up positioning surface 9, pass through free spaces 7 between rods 6 of the grid.

In the present configuration, workpiece pallets 2 have a peg 22 with an undercut 23, into which four claws of pallet gripper 12, each offset at 90°, can reach. Only the two claws 24 and 25 are shown in the cross-sectional view in FIG. 7. As pegs 22, like workpiece pallets 2, can become deformed due to fluctuating thermal stress and are subject to changes in length, undercuts 23 of the workpiece pallets used are in the form of a slot, as shown in FIG. 2. Claws 24 and 25 can then easily grip this slot, even if its position has changed slightly.

Pallet gripper 12 is equipped with six additional support pins 26, 27, 28, 29, 30 and 31, with which workpiece pallets 2 can be held in a design-specified transport position relative to pallet gripper 12.

Figure 7:
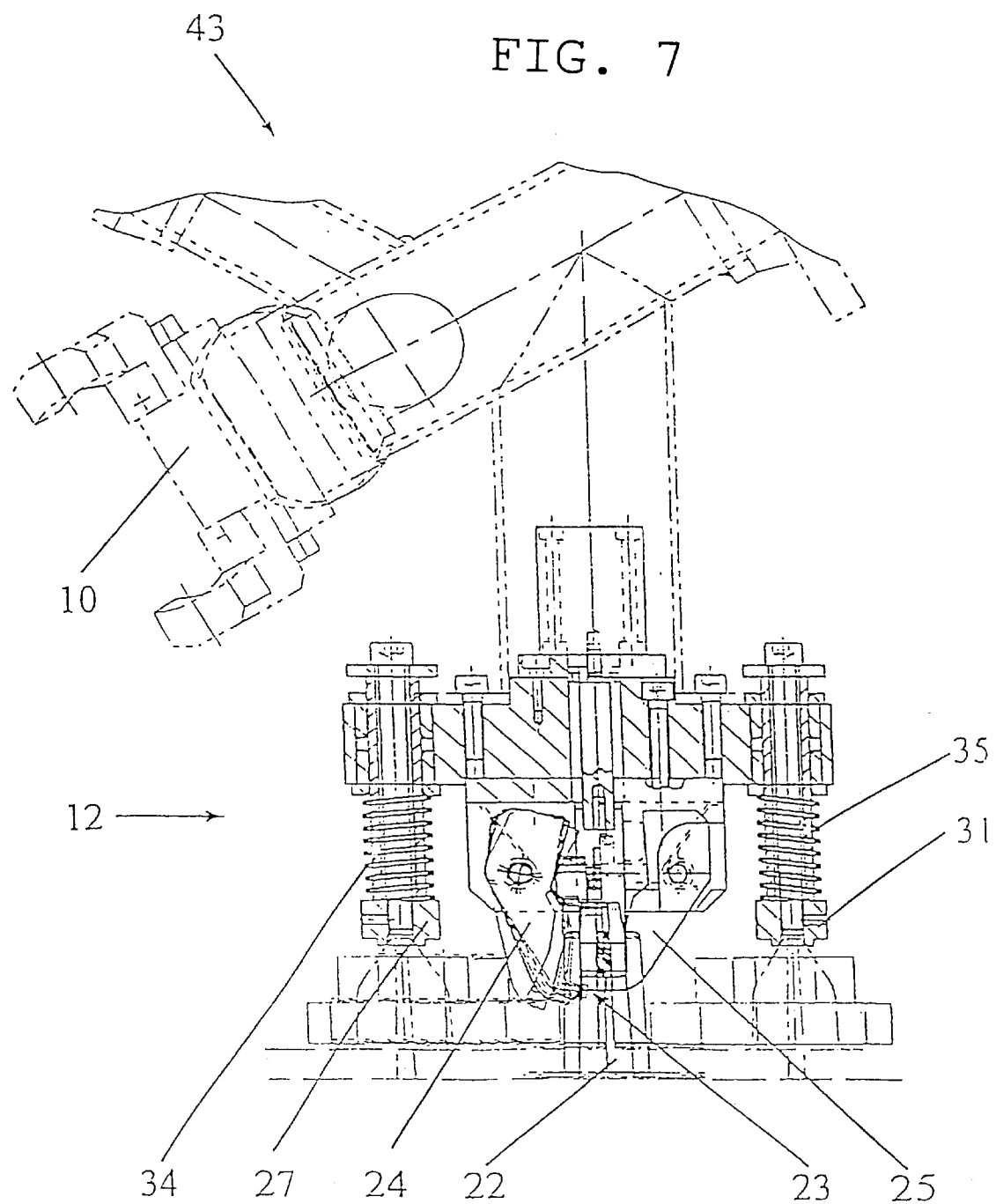

Each of support pins 26, 27, 28, 29, 30, 31, 32 and 33 is spring-loaded, springs 34 and 35 of support pins 27 and 31 being illustrated in the cross-sectional view in FIG. 7. Due to springs 34 and 35, support pins 27 and 32 each press down on workpiece pallet 2, so that it is held firmly in the specified transport position.

Figure 5:
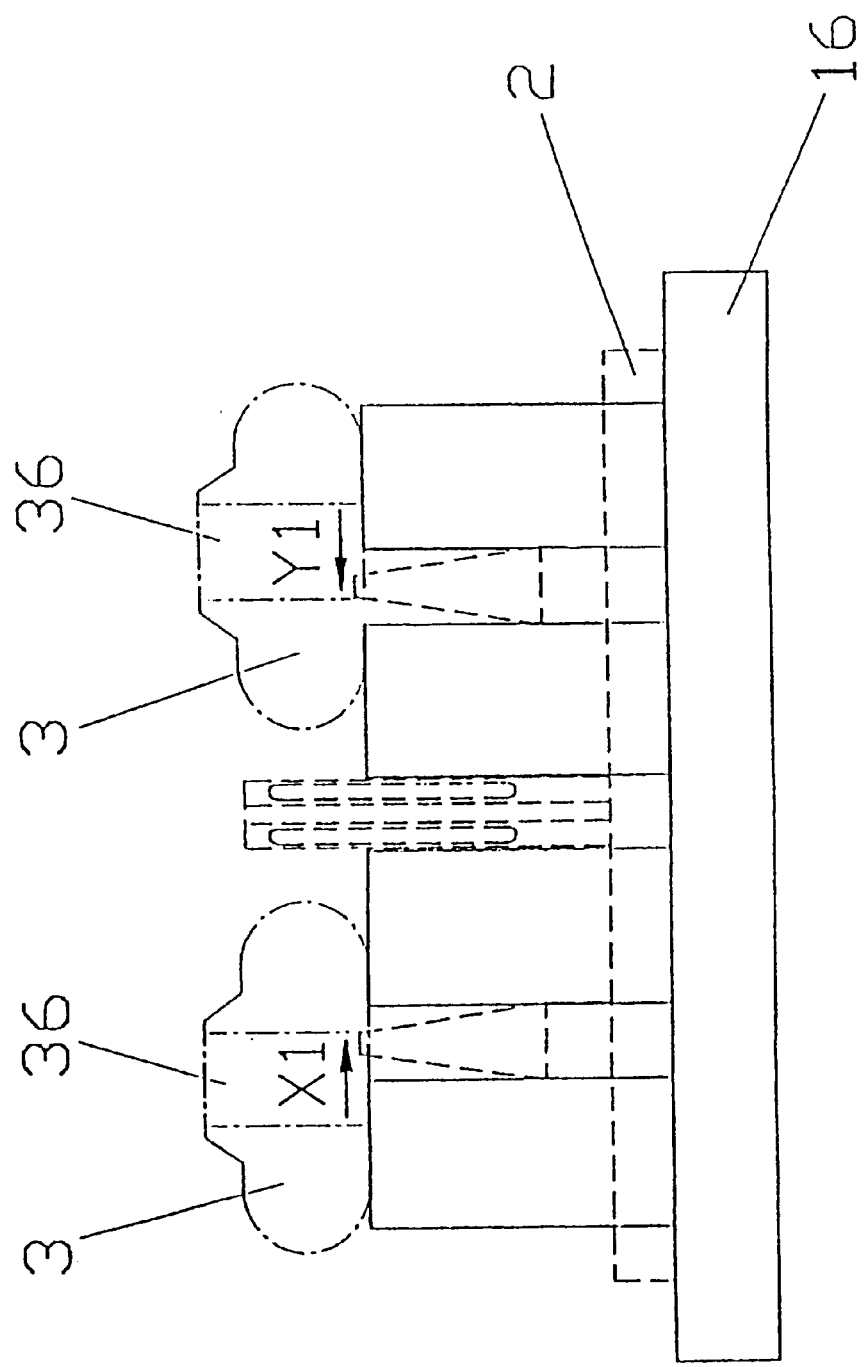
Figure 6:
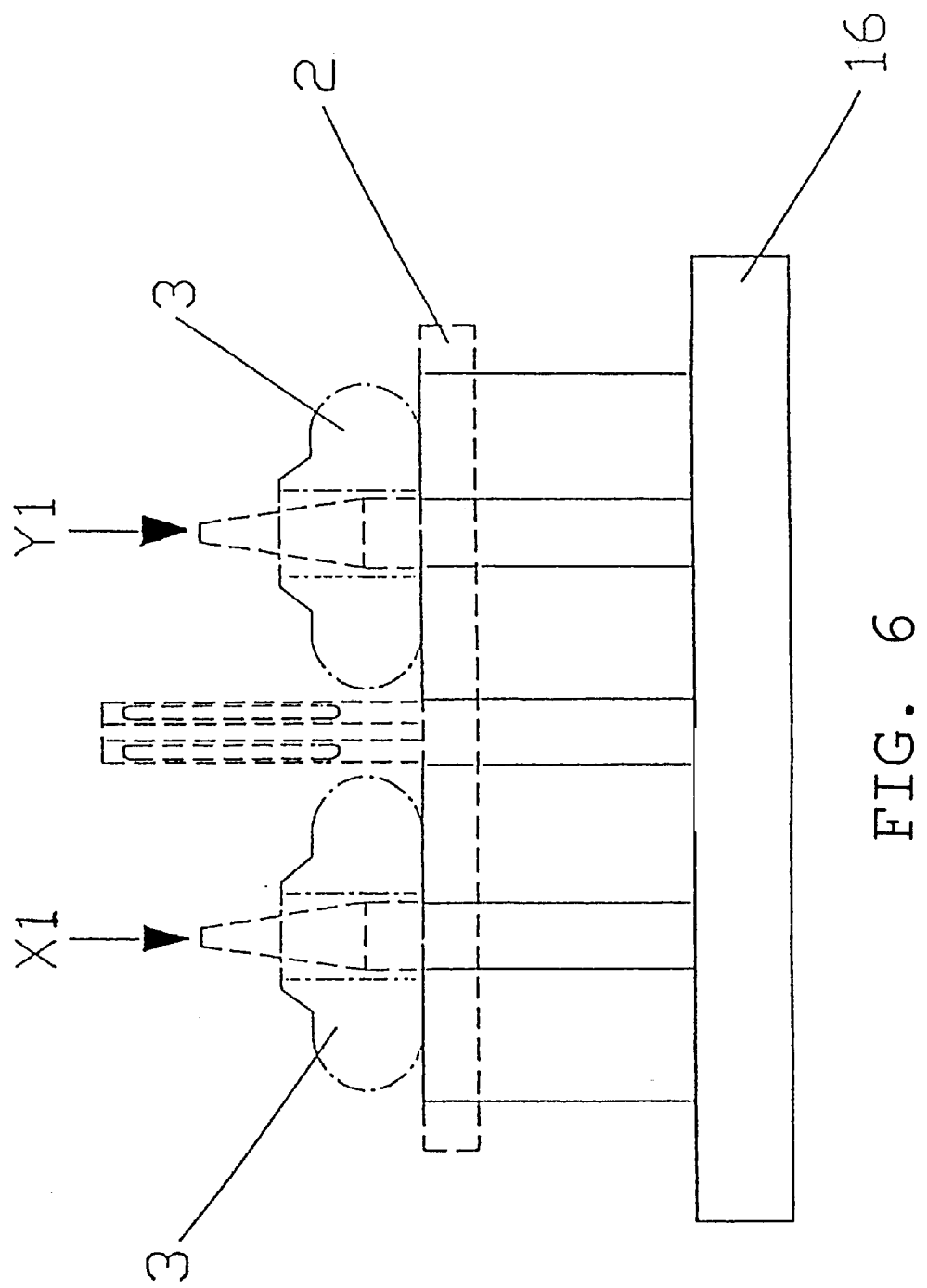

In the present configuration, workpiece pallets 2 are provided with special receiving regions 15 for accepting workpieces 3 with holes 36. For this purpose, receiving regions 15 have workpiece mounts 37, 38, 39, 40, 41 and 42 in the form of arbors. When using workpiece pallets of this kind, the workpieces can be deposited precisely in a specified position on positioning surface 9. By raising workpiece pallet 2, holes 36, initially positioned eccentrically to the arbors, can be shifted, as illustrated by arrows X1 and Y1 in FIG. 5. They are shifted on the arbors to concentric positions X2 and Y2, as illustrated in FIG. 6. If delicate workpieces 3 were, instead, to be simply dropped onto the arbors or pressed onto the arbors by a material handling machine in the eccentric position shown in FIG. 5, without the help of a positioning surface 9, they would be damaged. A high reject rate would be the result.

In the present configuration, support pins 26, 27, 28, 29, 30, 31, 32 and 33 rest against the free ends of the associated workpiece mounts 37, 38, 39, 40, 41 and 42.

Figure 8:
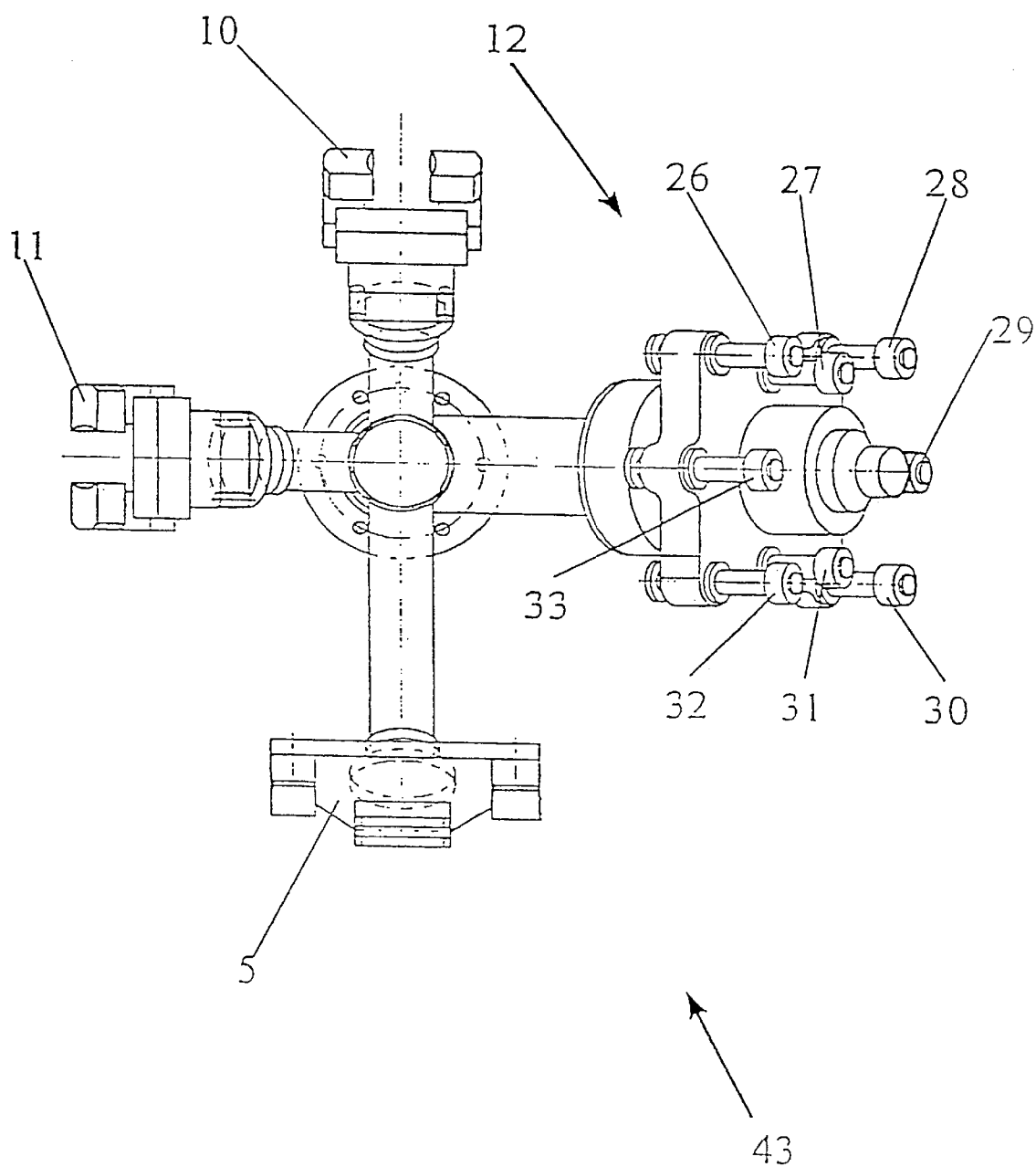

As shown in FIG. 8, a multi-gripper head 43 with four grippers is mounted on the articulated arm of the robot in the present configuration. These grippers comprise two workpiece grippers 10 and 11, one pallet gripper 12 and one base pallet gripper 5.

List of Reference Numbers

1 Device
2 Workpiece pallets
3 Workpieces
4 Articulated-arm robot
5 Base pallet
6 Rod
7 Free space
8 Workpiece pallet stack
9 Positioning surface
10 Workpiece gripper
11 Workpiece gripper
12 Pallet gripper
13 Lowering position
14 Receiving position
15 Receiving region
16 Positioning block
17 Recess
18 Side wall
19 Side wall
20 Side wall
21 Side wall
22 Peg
23 Undercut
24 Claw
25 Claw
26 Support pin
27 Support pin
28 Support pin
29 Support pin
30 Support pin
31 Support pin
32 Support pin
33 Support pin
34 Spring
35 Spring
36 Hole
37 Workpiece mount
38 Workpiece mount
39 Work oiece mount
40 Workpiece mount
41 Workpiece mount
42 Workpiece mount
43 Multi-gripper head
A Lateral distance
Z Feed system
X1 Arrow
X2 Position
Y1 Arrow
Y2 Position

What is claimed is:

1. Device (1) for the automatic handling of delicate workpieces (3), consisting of at least one workpiece pallet (2) for accepting the workpieces (3) in a receiving region (15), the workpiece pallet (2) comprising straight rods (6) disposed in grid-like manner with free spaces (7) between the rods (6), at least one workpiece gripper (10, 11) for depositing the workpieces (3) on a surface, and a pallet gripper (12) for holding the workpiece pallet (2), characterised in that at least one positioning device (16) with recesses (17) is provided, said recesses being sized relative to the size of said straight rods to receive portions thereof therewithin such that the rods (6) of the workpiece pallet (2) can be lowered into the recesses (17), the positioning device (16) having a positioning surface (9) extending in a plane for supporting the workpieces deposited thereon (3) by means of the workpiece gripper (10, 11), and said workpiece pallet having a peg extending therefrom such that the pallet gripper (12) lowers the empty workpiece pallet (2) by releasably gripping said peg and moving said workpiece pallet from a lowering position (13) lying above the positioning surface (9), through the plane of the positioning surface (9) and onto a receiving position surface (14) lying below the positioning surface (9) and defined by said recesses such that the receiving region (15) of the workpiece pallet (2) is lower than the positioning surface (9), and after depositing the workpieces (3) on the positioning surface with the workpiece pallet (2) lowered below the positioning surface (9), the workpiece pallet (2) is raised off of the receiving position surface by the pallet gripper by engaging with said peg.

2. The device according to claim 1, characterized in that the positioning device (16) is a positioning block having pocket-like recesses (17), and the rods (6) of the workpiece pallet (2) are lowered into the recesses (17).

3. The device for automatically loading workpiece pallets (2) according to claim 1, wherein the peg (22) has an undercut (23), and the pallet gripper (12) is provided with at least one claw (24, 25), which can pick up the workpiece pallet (2) by the undercut (23).

4. The device according to claim 1, characterized in that the pallet gripper (12) is provided with at least one support pin (26, 27, 28, 29, 30, 31, 32, 33), with which the workpiece pallet (2) is adapted to be held in a predetermined transport position relative to the pallet gripper (12).

5. The device according to claim 4, characterized in that the support pin (26, 27, 28, 29, 30, 31, 32, 33) is spring-loaded and presses on the workpiece pallet (2), such that the workpiece pallet is held in the predetermined transport position.

6. The device according to claim 5, characterized in that the at least one support pin (26, 27, 28, 29, 30, 31, 32, 33) rests on the free end of an arbor.

7. The device according to claim 1, characterized in that the pallet gripper (12) and the workpiece gripper (10, 11) are arranged on a portal-type loading system.

8. The device according to claim 1, characterized in that the pallet gripper (12) and the workpiece gripper (10, 11) are arranged on a robot.

9. The device according to claim 8, characterized in that the robot is an articulated-arm robot (4) having an articulated arm, on which articulated arm a multi-gripper head (43) is mounted, and that the multi-gripper head (43) consists of at least two workpiece grippers (10, 11) and one pallet gripper (12).

10. The device for automatically loading workpiece pallets (2) according to claim 1, wherein the receiving region (15) of the workpiece pallet (2) is provided with workpiece mounts (37, 38, 39, 40, 41, 42) in the form of arbors having free ends in order to accept workpieces (3) with holes, and the workpieces (3) are adapted to be deposited precisely in a specified position on the positioning surface (9) and the holes (36) in the workpieces (3) are adapted to be respectively positioned on the arbors of the workpiece pallets (2) by raising the workpiece pallet (2).

11. The device according to claim 10, characterized in that the support pin (26, 27, 28, 29, 30, 31, 32, 33) rests on the free end of an arbor.

12. The device according to claim 2, characterized in that the pocket-like recesses (17) of the positioning block (16) comprise continuous grooves.

13. The device according to claim 2, characterized in that the recesses have side walls (18, 19, 20, 21) and said sidewalls of the recesses (17) are positioned substantially parallel to the lowering and raising direction of the workpiece pallet (2).

14. The device according to claim 2, characterized in that each of the rods (6) of the workpiece pallet (2) is lowerable into the positioning block (16) at lateral distances from the walls (18, 19, 20, 21) of the recesses (17).

15. The device according to claim 2, characterized in that the positioning block (16) is made of soft material.

16. The device according to claim 15, wherein the positioning block is plastic and the pocket-like recesses (17) of the positioning block (16) comprise continuous grooves.

17. The device according to claim 16, characterized in that the recesses have side walls (18, 19, 20, 21) and said sidewalls of the recesses (17) are positioned substanially parallel to the lowering and raising direction of the workpiece.

18. The device according to claim 17, characterized in that each of the rods (6) of the workpiece pallet (2) is lowerable into the positioning block (16) at lateral distances from the walls (18, 19, 20, 21) of the recesses (17).

19. The device for automatically loading workpiece pallets (2) according to claim 18, where the peg (22) has an undercut (23), and the pallet gripper (12) is provided with at least one claw (24, 25), which is adapted to pick up the workpiece pallet (2) by the undercut (23).

20. The device according to claim 19, characterized in that the pallet gripper (12) is provided with at least one support pin (26, 27, 28, 29, 30, 31, 32, 33), with which the workpiece pallet (2) is adapted to be held in a predetermined transport position relative to the pallet gripper (12).

* * * * *